United States Patent
Yeom et al.

(10) Patent No.: US 12,319,364 B2
(45) Date of Patent: Jun. 3, 2025

(54) STEER-BY-WIRE STEERING APPARATUS

(71) Applicant: HL MANDO CORPORATION, Gyeonggi-do (KR)

(72) Inventors: Seul Ki Yeom, Gyeonggi-do (KR); Jung Sik Park, Gyeonggi-do (KR); Sang Hee Ahn, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 633 days.

(21) Appl. No.: 17/774,558

(22) PCT Filed: Nov. 3, 2020

(86) PCT No.: PCT/KR2020/015215
§ 371 (c)(1),
(2) Date: May 5, 2022

(87) PCT Pub. No.: WO2021/091194
PCT Pub. Date: May 14, 2021

(65) Prior Publication Data
US 2022/0402541 A1     Dec. 22, 2022

(30) Foreign Application Priority Data
Nov. 6, 2019     (KR) .................. 10-2019-0140831

(51) Int. Cl.
*B62D 5/00*          (2006.01)
*B62D 6/00*          (2006.01)

(52) U.S. Cl.
CPC ............. *B62D 5/006* (2013.01); *B62D 6/008* (2013.01)

(58) Field of Classification Search
CPC .................................................... B62D 5/005
See application file for complete search history.

(56) References Cited

U.S. PATENT DOCUMENTS 2,182,596 A  *   12/1939   Ole ..................... B62D 7/22
                                        74/495
2,862,722 A  *   12/1958   Brueder ................ B62D 7/22
                                        74/495

(Continued)

FOREIGN PATENT DOCUMENTS

CN          102109036         6/2011
CN          104214314         12/2014

(Continued)

OTHER PUBLICATIONS

International Search Report for PCT/KR2020/015215 mailed on Jan. 22, 2021 and its English Translation from WIPO (now published as WO 2021/091194).

(Continued)

*Primary Examiner* — Kevin Hurley
(74) *Attorney, Agent, or Firm* — WOMBLE BOND DICKINSON (US) LLP

(57) ABSTRACT

According to the embodiments of the present invention, the drive feel suitable to given conditions is provided to a driver by generating friction when a steering shaft is rotated to enhance the drive feel of the driver, limiting the maximum steering angle, restoring the steering wheel automatically, and controlling friction on the steering shaft in accordance with the steering angle, vehicle speed and road conditions.

14 Claims, 12 Drawing Sheets

(56) References Cited

U.S. PATENT DOCUMENTS

| | | | | |
|---|---|---|---|---|
| 5,964,315 A | * | 10/1999 | Suzuki | B62D 5/083 91/375 A |
| 6,705,419 B2 | * | 3/2004 | Menjak | B62D 5/006 180/444 |
| 2004/0182188 A1 | | 9/2004 | Nakamura et al. | |
| 2014/0034411 A1 | | 2/2014 | Sandholzer et al. | |
| 2019/0257366 A1 | | 8/2019 | Khale et al. | |

FOREIGN PATENT DOCUMENTS

| | | | | |
|---|---|---|---|---|
| CN | 109890685 | | 6/2019 | |
| CN | 110395312 | | 11/2019 | |
| CN | 218177871 U | * | 12/2022 | |
| DE | 102008040235 B4 | * | 9/2024 | B62D 1/16 |
| JP | 2007-131058 | | 5/2007 | |
| JP | 2007-269278 | | 10/2007 | |
| JP | 2013-056563 | | 3/2013 | |
| KR | 10-2019-0047369 | | 5/2019 | |

OTHER PUBLICATIONS

Written Opinion of the International Searching Authority for PCT/KR2020/015215 mailed on Jan. 22, 2021 and its English Translation by Google Translate (now published as WO 2021/091194).

Notice of Allowance dated Jul. 10, 2024 for Chinese Patent Application No. 202080077430.7 and its English translation provided by Applicant's foreign counsel.

Huang Binghua, Chen Zhenfu: "Study on the Characteristics of Automobile Active Steering System", vol. 30, Issue 3, Jun. 2008, pp. 1-5 and its English translation by Google translate.

Office Action dated Nov. 25, 2023 for Chinese Patent Application No. 202080077430.7 and its English translation by Google Translate.

International Preliminary Report on Patentability (Chapter I) for PCT/KR2020/015215 issued on May 10, 2022 and its English translation from WIPO (now published as WO 2021/091194).

Office Action dated Mar. 4, 2025 for Korean Patent Application No. 10-2019-0140831 and its English translation provided by Applicant's foreign counsel.

* cited by examiner

STEER-BY-WIRE STEERING APPARATUS

CROSS-REFERENCE TO RELATED APPLICATIONS

This application is the national stage of International Patent Application No. PCT/KR2020/015215 filed on Nov. 3, 2020, which claims priority to Korean Patent Application No. 10-2019-0140831 filed in the Korean Intellectual Property Office on Nov. 6, 2019, the disclosures of which are incorporated by reference herein in their entireties.

TECHNICAL FIELD

The present embodiments relate to a steer-by-wire steering device and, more specifically, to a steer-by-wire steering device that increases the driver's steering feeling by generating friction during steering shaft rotation.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Due to lack of mechanical linkage between the steering shaft and the wheels, steer-by-wire steering devices do not directly convey the sensation of weight, coming from wheel friction against the road or being stuck, to the driver and thus require that the user's steering feel be increased by arbitrarily exerting a reaction force to the steering shaft.

DETAILED DESCRIPTION OF THE INVENTION

Technical Problem

The present embodiments have been conceived in the foregoing background and relate to a steer-by-wire steering device that may increase the driver's steering feeling by generating friction during steering shaft rotation, restrict the maximum steering angle, automatically restore the steering wheel, and provide an appropriate steering feeling depending on circumstances to the driver by adjusting the frictional force applied to the steering shaft depending on the steering angle, vehicle speed, and road condition.

Technical Solution

According to the present embodiments, there may be provided a steer-by-wire steering device comprising a first housing having a first hole into which a steering shaft is inserted and a second hole having two opposite radial open ends and communicating with the first hole, a hollow sliding member screwed to the steering shaft and received in the first hole, and a pressurizing mechanism received in the second hole and including a first supporting member supported on the sliding member, an elastic member having an end supported on the first supporting member, and a second supporting member supported on another end of the elastic member.

Advantageous Effects

According to the present embodiments, it is possible to increase the driver's steering feeling by generating friction during steering shaft rotation, restrict the maximum steering angle, automatically restore the steering wheel, and provide an appropriate steering feeling depending on circumstances to the driver by adjusting the frictional force applied to the steering shaft depending on the steering angle, vehicle speed, and road condition.

MODE FOR CARRYING OUT THE INVENTION

Figure 1:
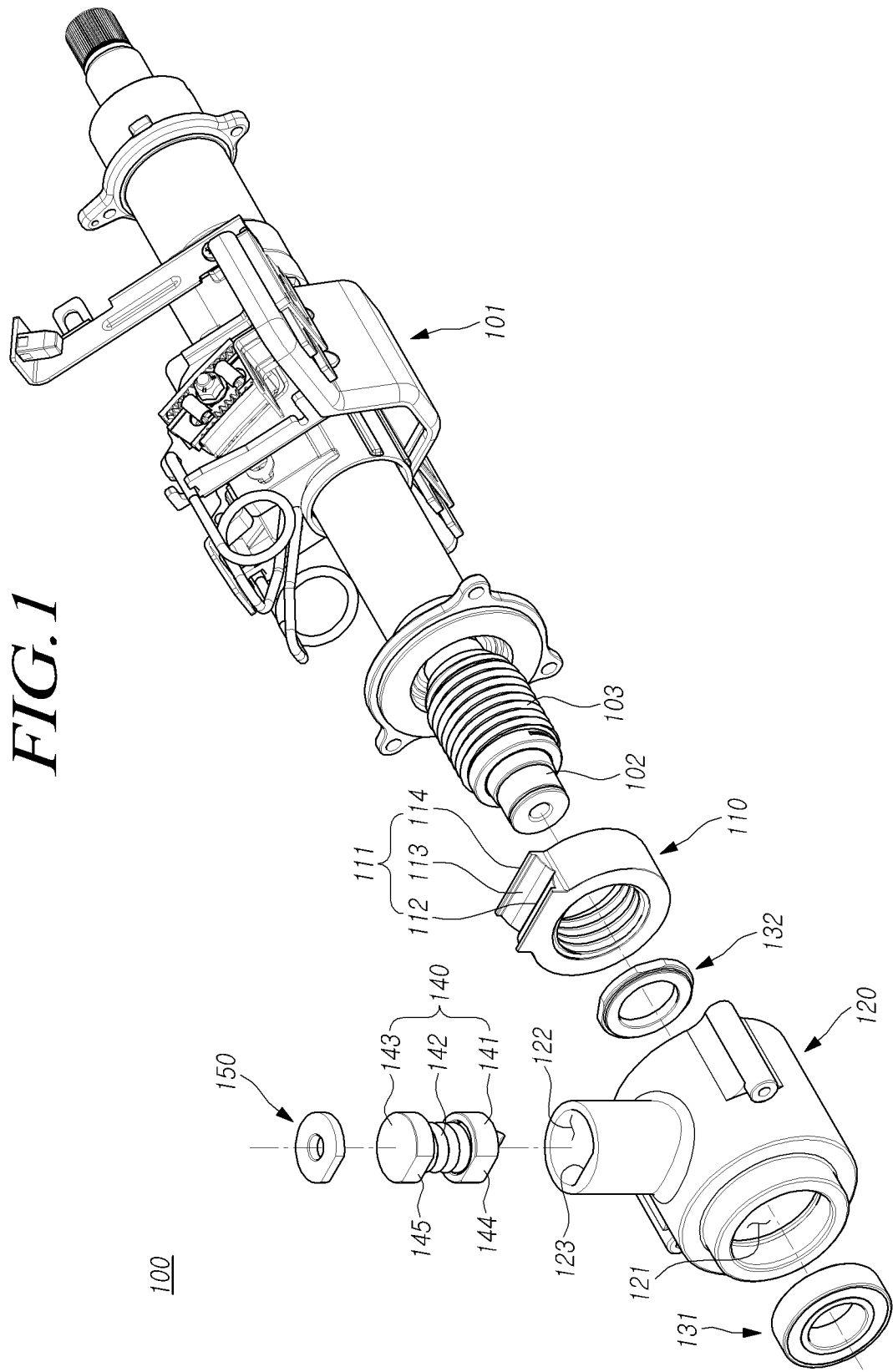
FIG. 1 is an exploded perspective view illustrating a steer-by-wire steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
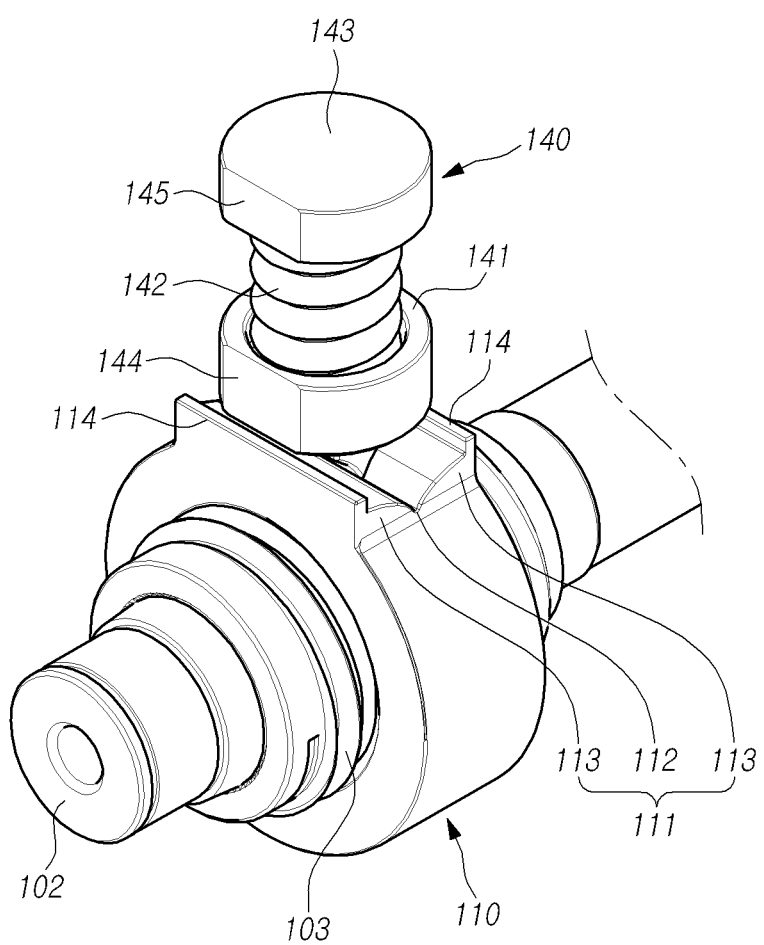
FIG. 2 is a perspective view illustrating a portion of FIG. 1.
Figure 3:
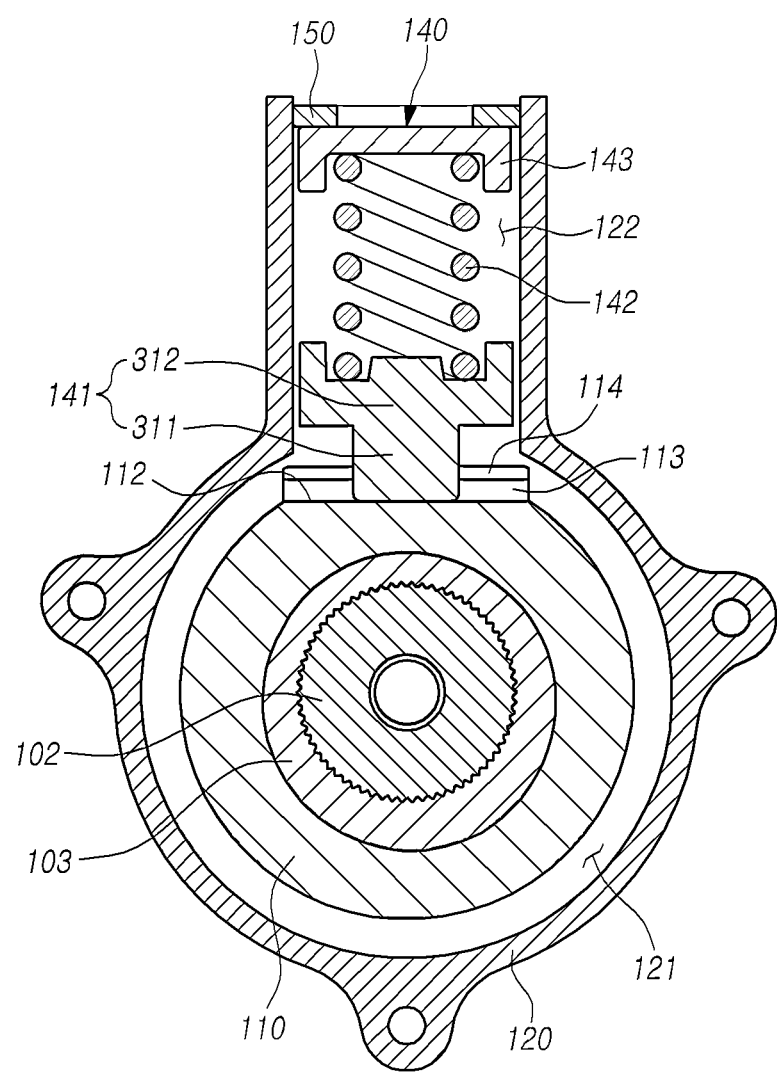
FIG. 3 is a cross-sectional view illustrating an assembled state of FIG. 1.
Figure 4:
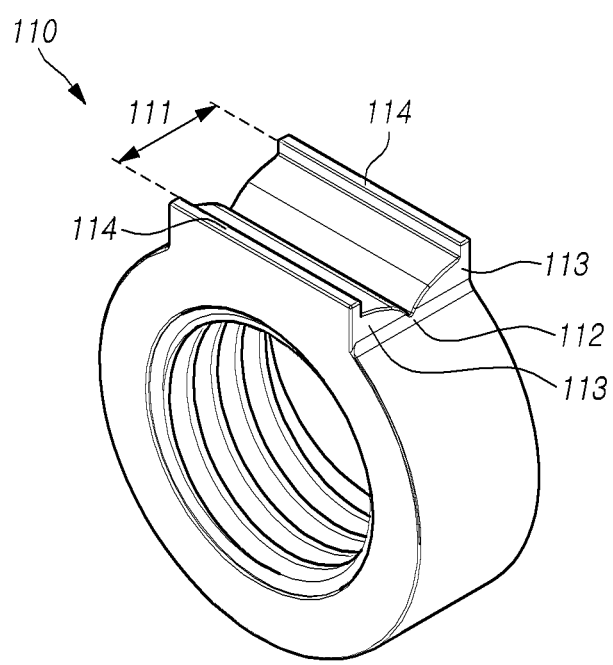
FIG. 4 is a perspective view illustrating a portion of FIG. 1.
Figure 5:
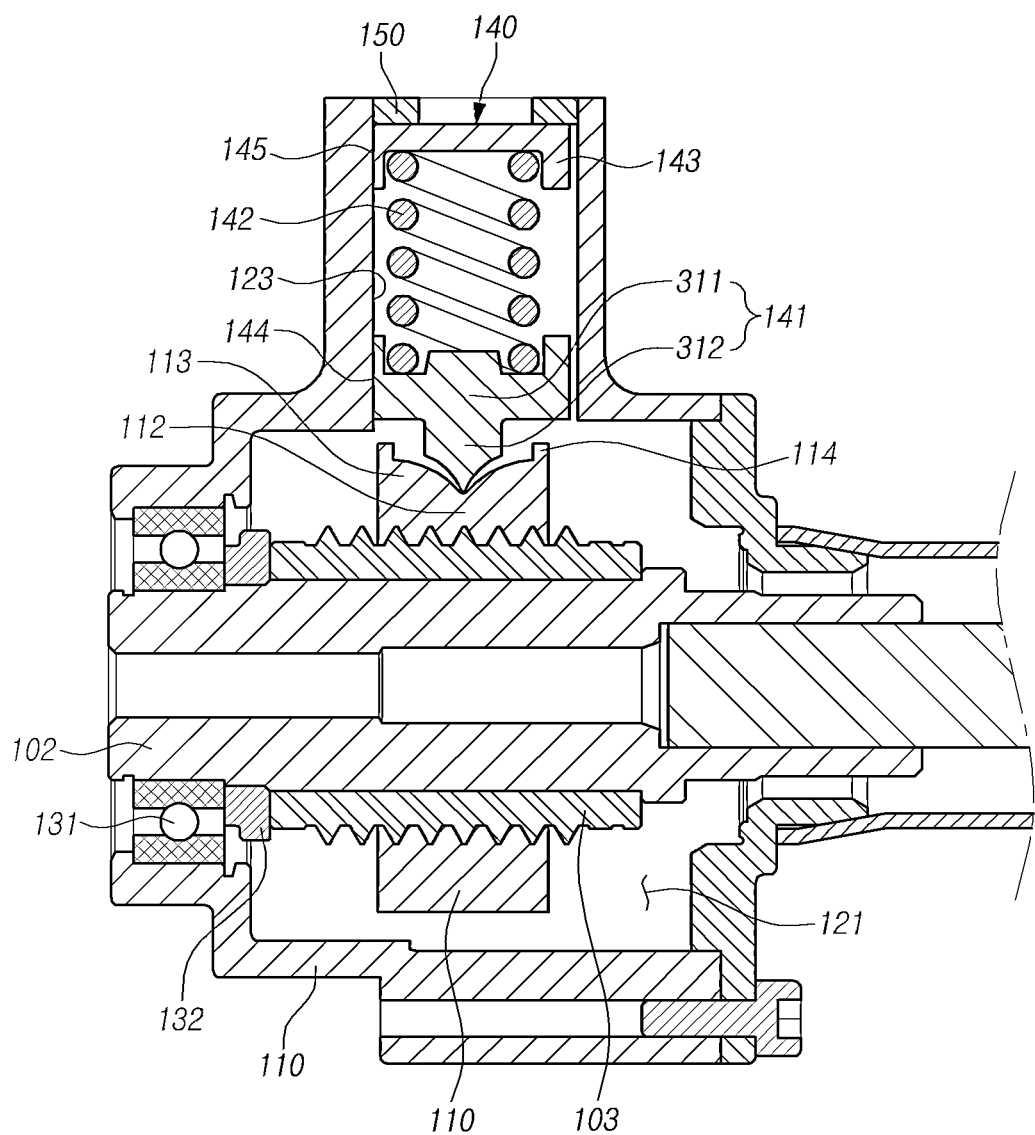
FIG. 5 is a cross-sectional view illustrating an assembled state of FIG. 1.
Figure 6:
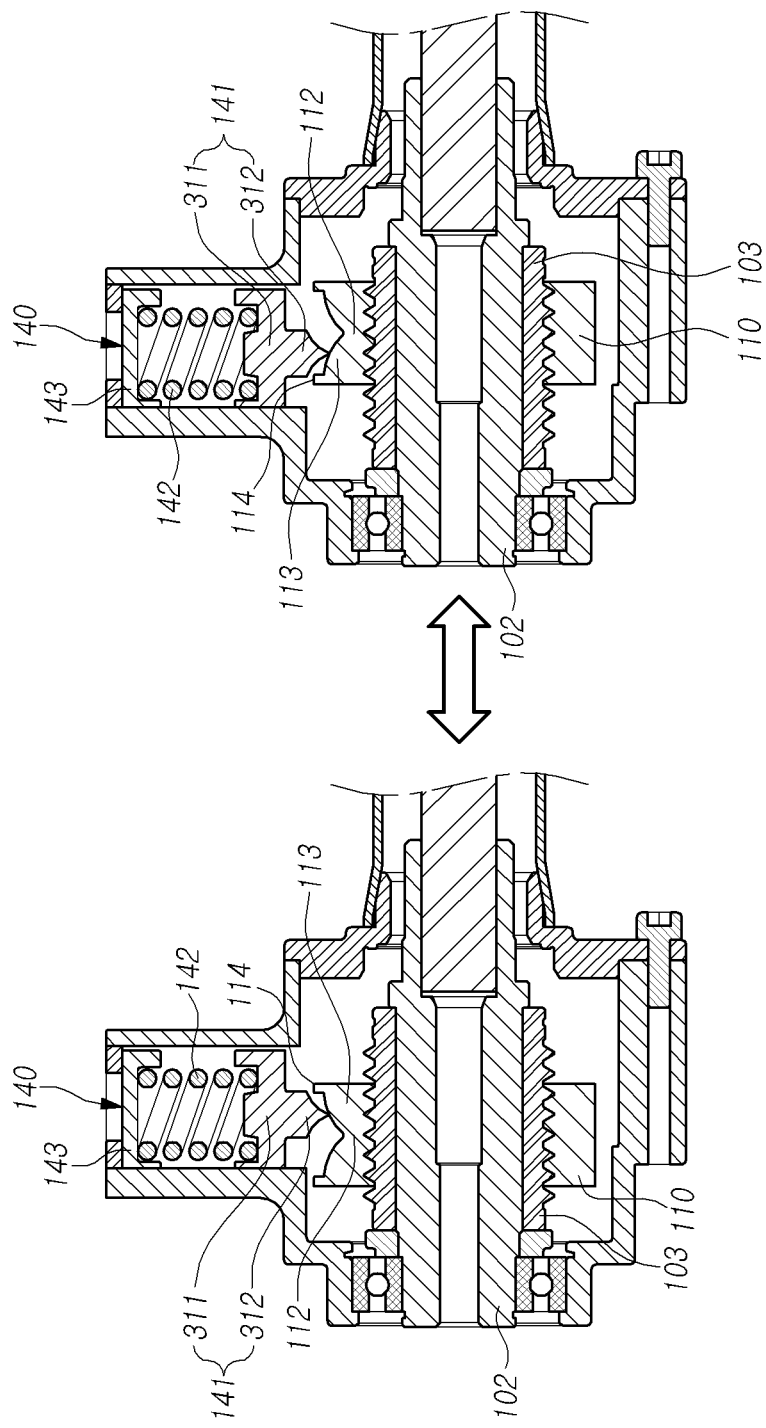
FIG. 6 is a cross-sectional view illustrating an operational state of a steer-by-wire steering device according to the present embodiments.
Figure 7:
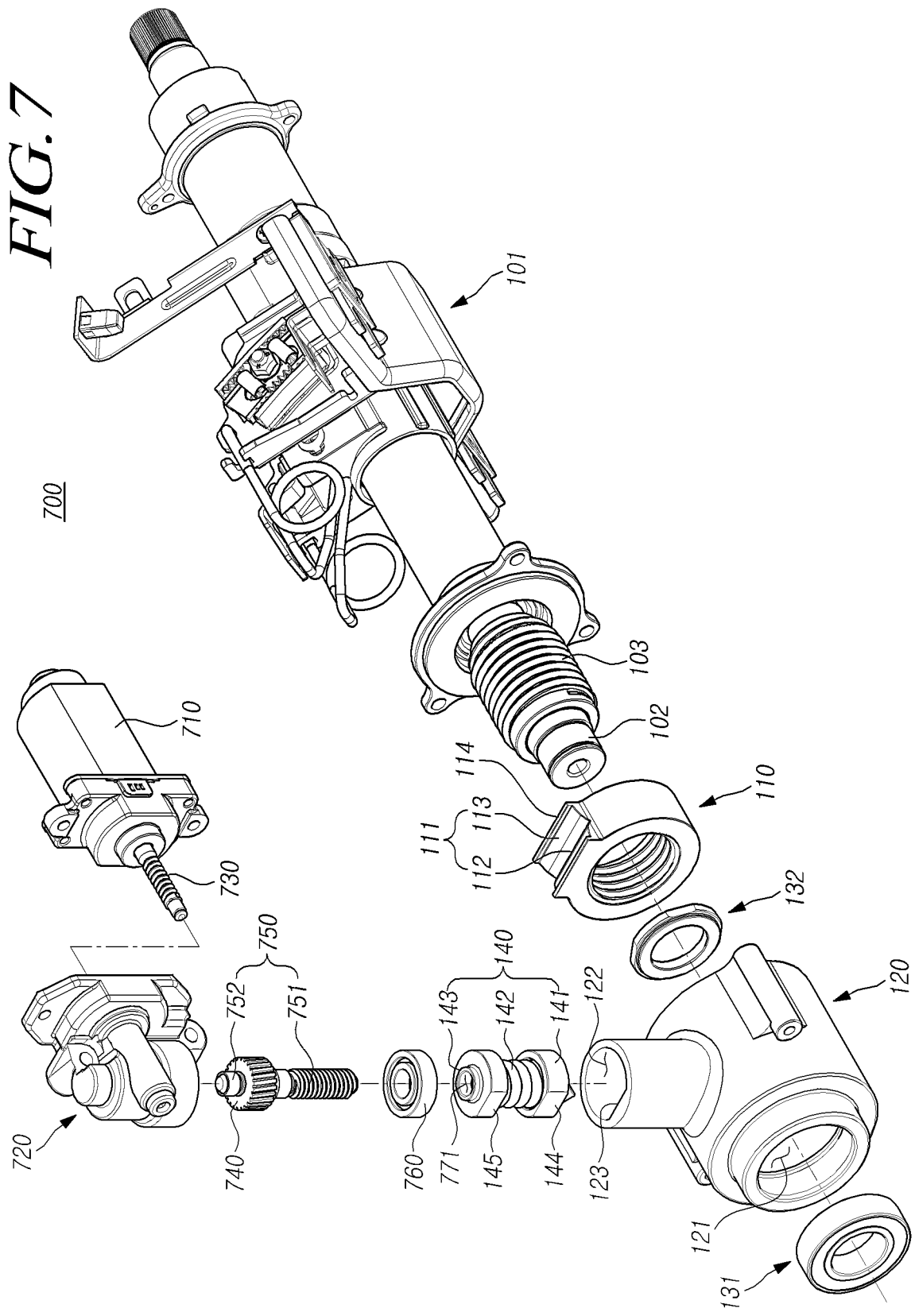
FIG. 7 is an exploded perspective view illustrating a steer-by-wire steering device according to the present embodiments.
Figure 8:
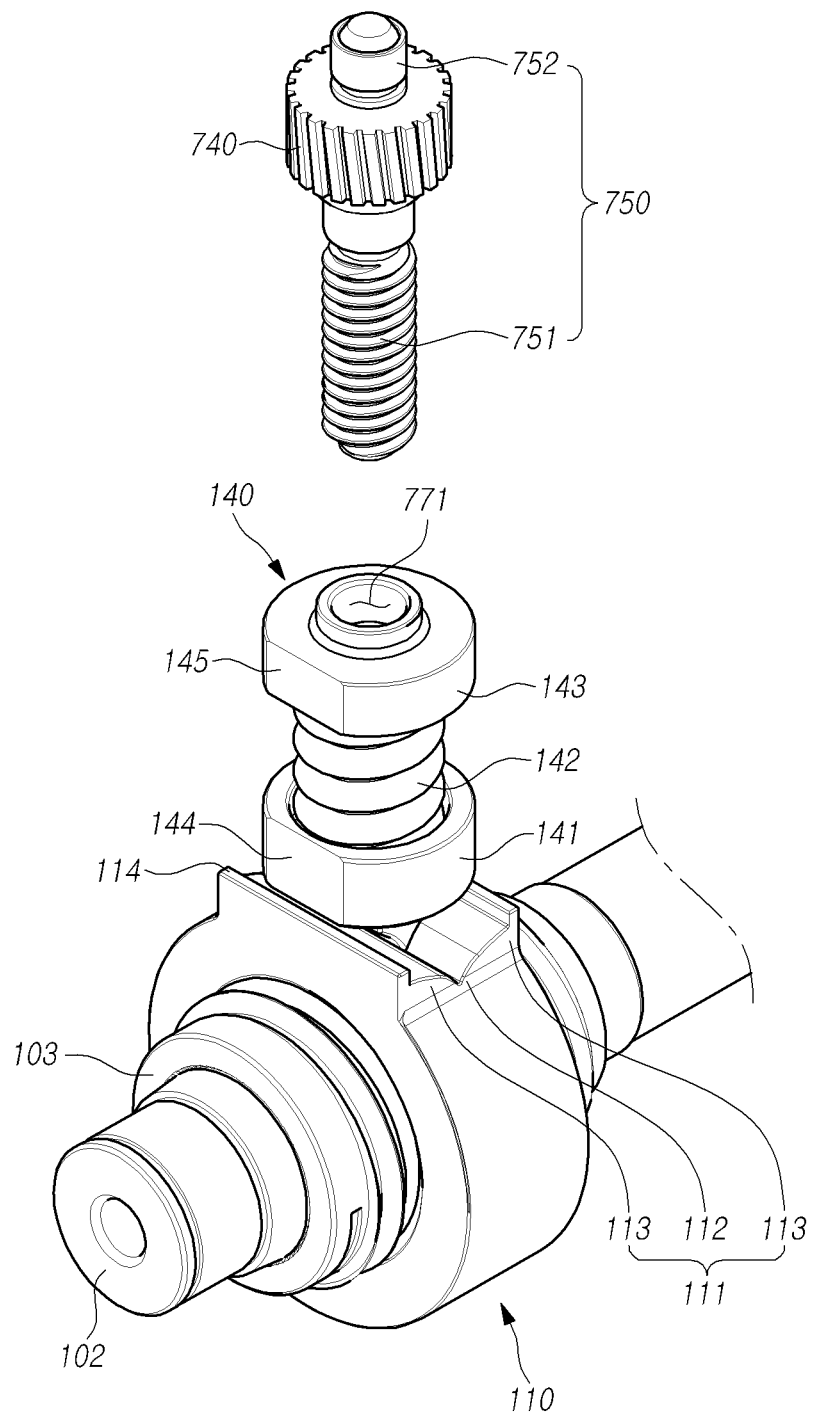
FIG. 8 is a perspective view illustrating a portion of FIG. 7.
Figure 9:
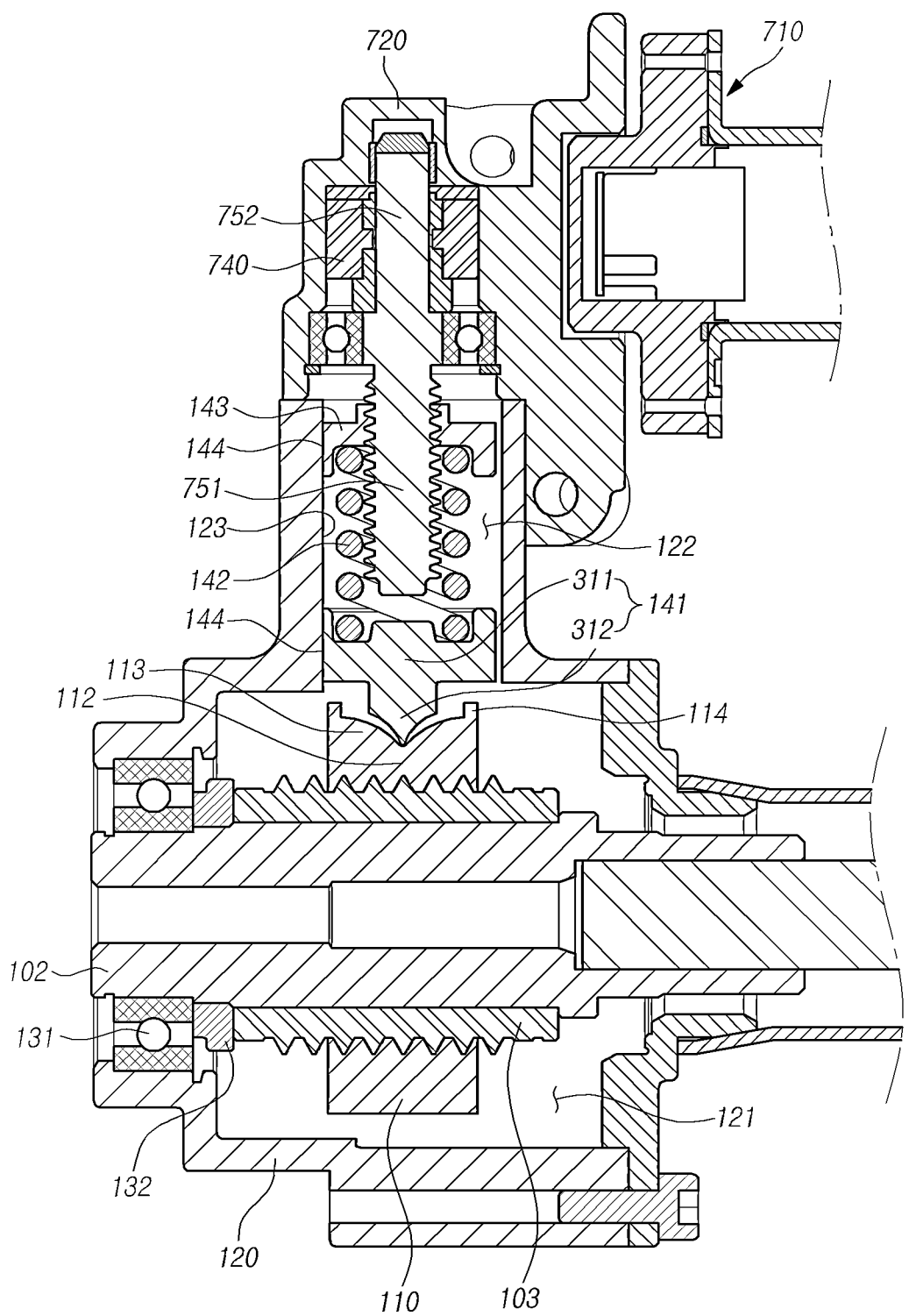
FIGS. 9 to 11 are cross-sectional views illustrating an assembled state of FIG. 7.
Figure 10:
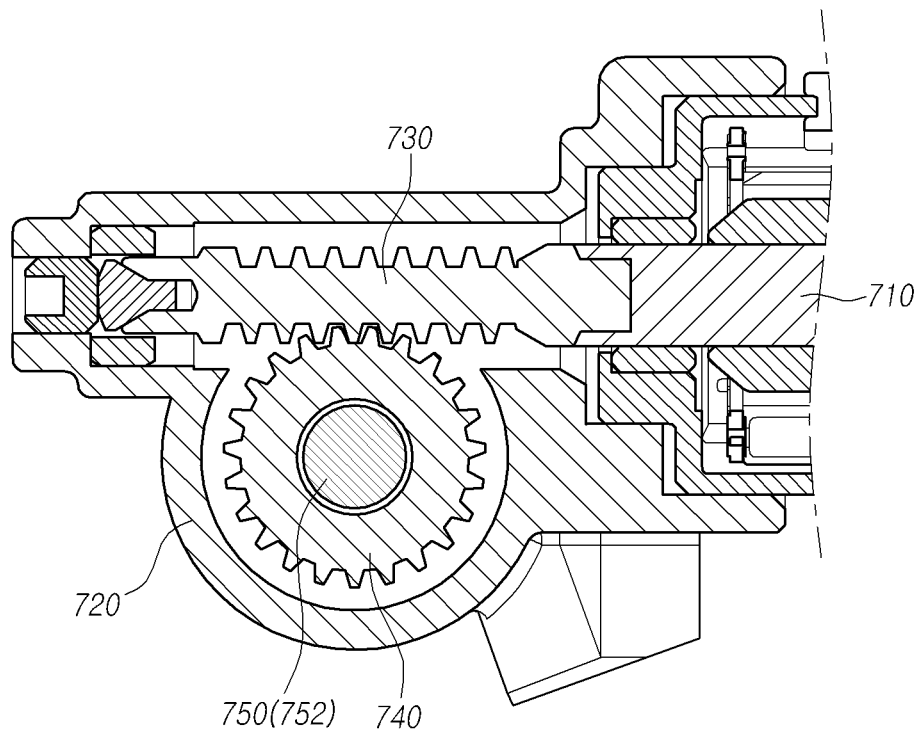
Figure 11:
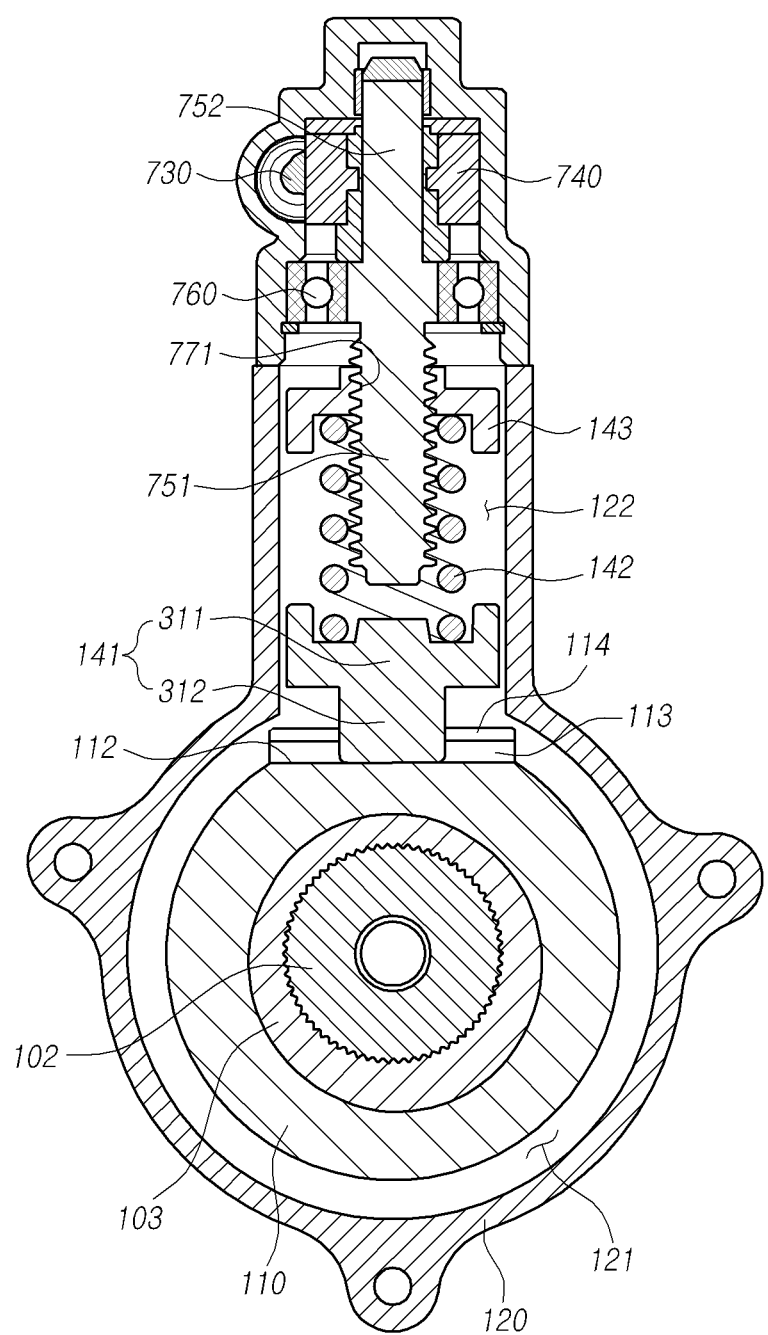
Figure 12:
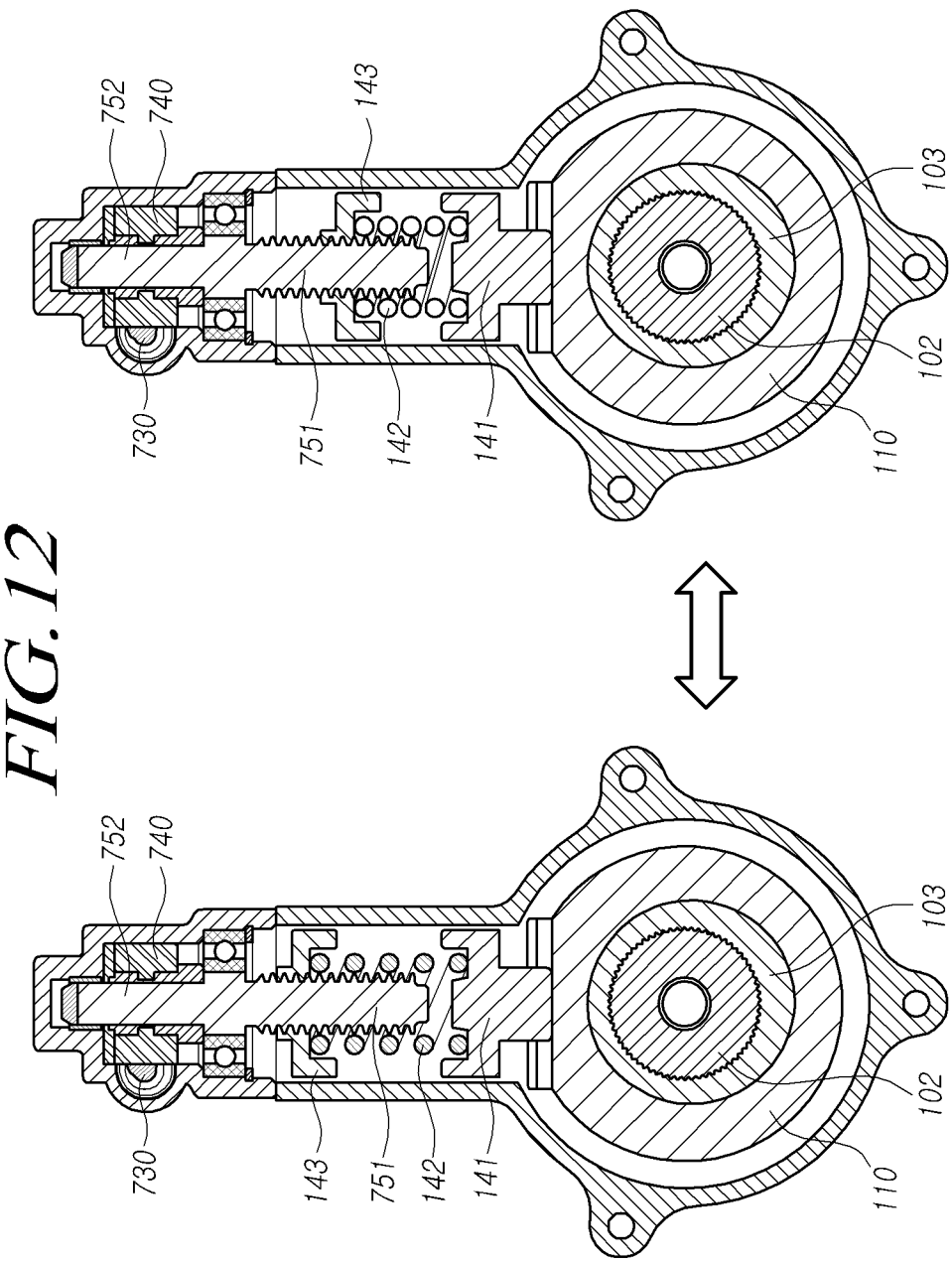
FIG. 12 is a cross-sectional view illustrating an operational state of a steer-by-wire steering device according to the present embodiments.

FIG. 1 is an exploded perspective view illustrating a steer-by-wire steering device according to the present embodiments. FIG. 2 is a perspective view illustrating a portion of FIG. 1. FIG. 3 is a cross-sectional view illustrating an assembled state of FIG. 1. FIG. 4 is a perspective view illustrating a portion of FIG. 1. FIG. 5 is a cross-sectional view illustrating an assembled state of FIG. 1. FIG. 6 is a cross-sectional view illustrating an operational state of a steer-by-wire steering device according to the present embodiments. FIG. 7 is an exploded perspective view illustrating a steer-by-wire steering device according to the present embodiments. FIG. 8 is a perspective view illustrating a portion of FIG. 7. FIGS. 9 to 11 are cross-sectional views illustrating an assembled state of FIG. 7. FIG. 12 is a cross-sectional view illustrating an operational state of a steer-by-wire steering device according to the present embodiments.

A steer-by-wire steering device 100 according to the present embodiments includes a first housing 120 having a first hole 121 into which a steering shaft 102 is inserted and a second hole 122 having two opposite radial open ends and communicating with the first hole 121, a hollow sliding member 110 screwed to the steering shaft 102 and received in the first hole 121, and a pressurized mechanism 140 received in the second hole 122 and including a first supporting member 141 received in the second hole 122 and supported on the sliding member 110, an elastic member 142 having an end supported on the first supporting member 141, and a second supporting member 143 supported on another end of the elastic member 142.

A sensor for sensing, e.g., the steering angle or steering torque according to the driver's manipulation of the steering wheel is provided on the steering shaft 102, and an electronic control unit (not shown) steers the wheels based on the information sensed by the sensor.

Referring to FIG. 1, a steering column 101 is coupled to the vehicle body by a mounting bracket, and the first housing 120, the sliding member 110, and the pressurizing mechanism 140 may be provided under the steering column 101.

The first housing 120 includes the first hole 121 into which the steering shaft 102 is inserted and the second hole 122 having two opposite radial open ends and communicating with the first hole 121 and is coupled to the steering column 101.

In other words, the first hole 121 is formed coaxially with the steering shaft 102, and the second hole 122 communicates with the first hole 121, in a radial inside thereof, and has two opposite open ends.

A bearing 131 may be coupled to the inner circumferential surface of the first hole 121 to support rotation of the steering shaft 102.

The sliding member 110 is hollow and is screwed to the steering shaft 102 and is received in the first hole 121. In other words, the sliding member 110 is coupled to a lower end of the steering shaft 102, which is inserted into the first hole 121.

As is described below, the sliding member 110 is circumferentially supported on the protrusion 312 of the first supporting member 141 and, as the steering shaft 102 is rotated, the sliding member 110 is circumferentially fixed while being slid only axially by screwing.

The steering shaft 102 may have a thread on the outer circumferential surface thereof, so that the sliding member 110 is screwed onto the outer circumferential surface of the steering shaft 102. However, as shown in the drawings, a sleeve 103 having a threaded outer circumferential surface is coupled to the steering shaft 102, and the sliding member 110 may be screwed to the sleeve 103.

In other words, the inner circumferential surface of the sleeve 103 and the outer circumferential surface of the steering shaft 102 may be serrated to be engaged with each other, so that the sleeve 103 is rotated together with the steering shaft 102, and the sliding member 110 is screwed onto the outer circumferential surface of the sleeve 103 and is axially slid.

A lock nut 132, axially fixing the sleeve 103 coupled via serrations may be coupled to the steering shaft 102.

The pressurizing mechanism 140 is received in the second hole 122 and includes the first supporting member 141 supported on the sliding member 110, the elastic member 142 having an end supported on the first supporting member 141, and the second supporting member 143 supported on another end of the elastic member 142.

Referring to FIGS. 2 and 3, the elastic member 142 is provided between the first supporting member 141 and the second supporting member 143 to elastically support the first supporting member 141, so that the pressurizing mechanism 140 creates friction on the contact surface between the sliding member 110 and the first supporting member 141 when the steering shaft 102 is rotated, thus increasing the driver's steering feeling.

In other words, since the first supporting member 141 is axially fixed when the sliding member 110 is axially slid as the steering shaft 102 is rotated, friction is created between the sliding member 110 and the first supporting member 141.

Further, the sliding member 110 may restrict the maximum steering angle or change the steering feeling depending on the steering angle by including a contact portion 111 or a stepped portion 114, which is described below in detail.

Further, to prevent failure to create friction as the first supporting member 141 escapes off the outer circumferential surface of the sliding member 110 or the contact surfaces are misaligned, the respective outer circumferential surfaces of the first supporting member 141 and the second supporting member 143 have first flat portions 144 and 145, respectively, on one side of each thereof, and the inner circumferential surface of the second hole 122 has a second flat portion 123 supporting the first flat portions 144 and 145.

As the first flat portions 144 and 145 are supported on the second flat portion 123, and the first supporting member 141 and the second supporting member 143 are circumferentially fixed in the second hole 122, the contact surfaces of the first supporting member 141 and the sliding member 110 may remain stable when the steering shaft 102 is rotated. In particular, as described below, when the first supporting member 141 axially slides in the second hole 122, the first supporting member 141 may be prevented from escaping or sliding off the outer circumferential surface of the sliding member 110.

Further, to axially fix the second supporting member 143 in the second hole 122, a coupling member 150 supported on the axial outer surface of the second supporting member 143 is coupled to the inner circumferential surface of the second hole 122.

In other words, as the radial inner surface of the second supporting member 143 is supported on the other end of the elastic member 142, and the radial outer surface thereof is supported on the coupling member 150, the second supporting member 143 is axially fixed in the second hole 122.

The radial inner surface of the second supporting member 143 is depressed to allow the other end of the elastic member 142 to be seated.

The coupling member 150 may be, e.g., press-fitted or screwed to the second hole 122. In the embodiment shown in the drawings, the coupling member 150 is chamfered to be press-fitted while being supported on the second flat portion 123.

Further, the first supporting member 141 includes a body 311 supported on the elastic member 142 and a protrusion 312 protruding from the body 311 and supported on the sliding member 110 in the circumferential direction of the sliding member 110.

In other words, the protrusion 312 protrudes on the radial inner surface of the body 311, and one end of the elastic member 142 is supported on the radial outer surface. Like the second supporting member 143, the radial outer surface of the body 311 is depressed to allow one end of the elastic member 142 to be seated.

As described above, as the protrusion 312 is circumferentially supported on the first supporting member 141, when the steering shaft 102 is rotated, the sliding member 110 is circumferentially fixed and is slid only axially by screwing.

As shown in the drawings, the protrusion 312 may be elongated in a direction perpendicular to both the axial direction of the first hole 121 and the axial direction of the second hole 122, and the sliding member 110 has the contact portion 111 supporting the protrusion 312 and is thus circumferentially supported on the protrusion 312.

Referring to FIGS. 4 to 6, a pair of stepped portions 114 axially facing each other, with the protrusion 312 disposed therebetween, protrude from the outer circumferential surface of the sliding member 110.

In other words, as the steering shaft 102 is rotated, one or another axial surface of the protrusion 312 is supported by the stepped portions 114, restricting the slide of the sliding member 110 and hence limiting the maximum steering angle of the steering wheel.

It is possible to set different maximum steering angle ranges by adjusting the interval between the stepped portions 114.

Further, the sliding member 110 includes the contact portion 111 provided between the stepped portions 114. The contact portion 111 includes a center portion 112 having the smallest radial thickness and inclined portions 113 having a thickness increasing from the center portion to two opposite axial sides.

The inclined portions 113 are provided to be symmetrical on the two opposite axial sides of the center portion 112. In other words, the inclined portions 113 are provided between the center portion 112 and the stepped portions 114.

In a state in which the steering angle is 0 as shown in FIG. 5, the protrusion 312 is supported on the center portion 112. If the driver steers the steering wheel as shown in FIG. 6, the elastic member 142 is compressed due to the difference in thickness of the inclined portions 113 so that friction between the protrusion 312 and the sliding member 110 increases.

In other words, as the steering angle increases, steering is heavier, so that the driver's steering feeling may be increased.

Further, as the inclined portions 113 have a radial thickness increasing from the center portion 113 to the stepped portions 114, the steering wheel may automatically be restored by the elastic force of the pressurizing mechanism 140.

In other words, since the contact surfaces of the protrusion 312 and the inclined portions 113 are formed to be inclined with respect to the axial direction of the sliding member 110 due to the difference in thickness of the inclined portions 113, the pressurizing mechanism 140 axially applies an elastic force to the sliding member 110, so that the sliding member 110 is slid in a direction in which the center portion 112 faces the protrusion 312, and the steering shaft 102 and the steering wheel are automatically restored.

Since the inclined portions 113 are symmetrically formed on two opposite sides of the center portion 112, the sliding member 110 receives elastic force in the direction in which the center portion 112 faces the protrusion 312, in both the state in which the steering wheel is rotated to one side and the state in which the steering wheel is rotated to the other side.

Further, to restore the steering wheel, which is automatically rotated by the pressurizing mechanism 140, to the neutral state in which the steering angle is 0, the protrusion 312 is formed so that the circumferential thickness thereof reduces to the tip, and the center portion 112 is formed to be depressed.

In other words, while the steering wheel is automatically restored, the sliding member 110 may be stopped, with the protrusion 312 not supported by the center portion 112 but misaligned, due to friction between the protrusion 312 and the contact portion 111. As the protrusion 312 is formed to be tapered, and the center portion 112 is formed to be depressed, it is possible to prevent the sliding member 110 from being stopped with the protrusion 312 and the center portion 112 misaligned, and more quickly and precisely restore the steering wheel.

As shown in the drawings, the inclined portions 113 are formed so that the curvature of the outer surface thereof increases to the center portion 112. Thus, the center portion 112 may be depressed in a tapered shape corresponding to the protrusion 312.

Meanwhile, to further increase the driver's steering feeling according to the steering angle, vehicle speed, and road condition, the steer-by-wire steering device 700 according to the present embodiments may further include a motor 710, a second housing 720, and a rotation shaft 750 and may thereby slide the second supporting member 143 in the axial direction of the second hole 122, adjusting the frictional force that is applied to the sliding member 110 by the pressurizing mechanism 140.

Referring to FIGS. 7 and 8, the second housing 720 is coupled to a portion of the first housing 120, where the second hole 122 is formed. Inside the second housing 720 is provided a reducing structure that transfers the power of the motor 710 to the second supporting member 143.

The second supporting member 143 has a coupling hole 771 which passes through the second supporting member 143 in the axial direction of the second hole 122, and a rotation shaft 750 screwed with the second supporting member 143 and rotated by the motor 710 is inserted into the coupling hole 771.

In other words, as the motor 710 rotates the rotation shaft 750, the second supporting member 143 is moved back and forth inside the second hole 122, and the elastic member 142 is compressed or extended.

As described above, since the first flat portion 145 of the second supporting member 143 and the second flat portion 123 of the second hole 122 are supported on each other, when the rotation shaft 750 is rotated, the second supporting member 143 is not rotated but axially slid by the screwed coupling.

Referring to FIGS. 9 and 10, the rotation shaft 750 includes a screw portion 751 inserted into the coupling hole 771 and a coupling portion 752 coupled with the worm wheel 740. The motor shaft of the motor 710 is coupled with the worm shaft 730 engaged with the worm wheel 740.

In other words, the screw portion 751 is threaded to be screwed with the second supporting member 143. The coupling portion 752 is, e.g., serrated, so that the worm wheel 740 is circumferentially fixed.

The motor 710 is coupled to the second housing 720 so that the motor shaft is perpendicular to the axial direction of the second hole 122, and the worm shaft 730 engaged with the worm wheel 740 is coupled to the motor shaft, so that the torque of the motor 710 is decelerated to rotate the rotation shaft 750 and slide the second supporting member 143.

Referring to FIGS. 11 and 12, as the motor 710 slides the second supporting member 143 to compress or extend the elastic member 142 as such, the pressurizing mechanism 140 may adjust the frictional force applied to the sliding member 110.

In other words, if the motor 710 moves the second supporting member 143 forth, the elastic member 142 is compressed, and the frictional force applied to the sliding member 110 is increased, so that the steering feeling is heavier. If the motor 710 moves the second supporting member 143 back, the elastic member 142 is extended, and the frictional force applied to the sliding member 110 is decreased, so that the steering feeling is lighter.

The motor 710 is controlled by an electronic control unit receiving information, e.g., vehicle speed, steering angle, or steering torque. For example, when the vehicle speed is low, the motor 710 may move back the second supporting member 143 to make the steering feel lighter and, when the vehicle speed is high, the motor 710 may move forth the second supporting member 143 to make the steering feel heavier.

By the so-shaped steer-by-wire steering device, it is possible to increase the driver's steering feeling by generating friction during steering shaft rotation, restrict the maximum steering angle, automatically restore the steering wheel, and provide an appropriate steering feeling depending on circumstances to the driver by adjusting the frictional force applied to the steering shaft depending on the steering angle, vehicle speed, and road condition.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority to Korean Patent Application No. 10-2019-0140831 filed in the Korean Intellectual Property Office on Nov. 6, 2019, the disclosure of which is incorporated by reference herein in its entirety.

The invention claimed is:

1. A steer-by-wire steering device, comprising:
a first housing having a first hole into which a steering shaft is inserted and a second hole having two opposite radial open ends and communicating with the first hole;
a hollow sliding member screwed to the steering shaft and received in the first hole; and
a pressurizing mechanism received in the second hole and including a first supporting member supported on the sliding member, an elastic member having an end supported on the first supporting member, and a second supporting member supported on another end of the elastic member.

2. The steer-by-wire steering device of claim 1, wherein a sleeve having a threaded outer circumferential surface is coupled to the steering shaft, and wherein the sliding member is screwed with the sleeve.

3. The steer-by-wire steering device of claim 1, wherein an outer circumferential surface of each of the first supporting member and the second supporting member has a first flat portion on one side thereof, and an inner circumferential surface of the second hole has a second flat portion supporting the first flat portion.

4. The steer-by-wire steering device of claim 1, wherein a coupling member supported on a radial outer surface of the second supporting member is coupled to an inner circumferential surface of the second hole.

5. The steer-by-wire steering device of claim 1, wherein the first supporting member includes a body supported on the elastic member and a protrusion protruding from the body and supported on the sliding member in a circumferential direction of the sliding member.

6. The steer-by-wire steering device of claim 5, wherein the protrusion is elongated in a direction perpendicular to both an axial direction of the first hole and an axial direction of the second hole.

7. The steer-by-wire steering device of claim 5, wherein a pair of stepped portions axially facing each other, with the protrusion disposed therebetween, protrude from an outer circumferential surface of the sliding member.

8. The steer-by-wire steering device of claim 7, wherein the sliding member includes a contact portion provided between the stepped portions, and
wherein the contact portion includes a center portion having a smallest radial thickness and inclined portions having a radial thickness increasing from the center portion to two opposite axial sides.

9. The steer-by-wire steering device of claim 8, wherein the protrusion is formed to have a circumferential thickness decreasing to an end thereof, and wherein the center portion is depressed.

10. The steer-by-wire steering device of claim 9, wherein the inclined portions are formed to have a curvature of an outer surface increasing to the center portion.

11. The steer-by-wire steering device of claim 1, wherein a second housing coupled with a motor for moving back and forth the second supporting member is coupled to the first housing.

12. The steer-by-wire steering device 11, wherein the second supporting member has a coupling hole passing through the second supporting member in an axial direction of the second hole, and
wherein a rotation shaft rotated by the motor and screwed with the second supporting member is inserted into the coupling hole.

13. The steer-by-wire steering device of claim 12, wherein the rotation shaft includes a screw portion inserted into the coupling hole and a coupling portion coupled with a worm wheel, and
wherein a motor shaft of the motor is coupled with a worm shaft engaged with the worm wheel.

14. The steer-by-wire steering device of claim 11, wherein the motor moves back the second supporting member when a vehicle speed is low and moves forth the second supporting member when the vehicle speed is high.

* * * * *